United States Patent [19]

Hirasawa

[11] Patent Number: 5,216,509
[45] Date of Patent: Jun. 1, 1993

[54] SAMPLER HOLD CIRCUIT FOR CCD IMAGE-SENSOR SIGNAL

[75] Inventor: Masahiro Hirasawa, Tokyo, Japan

[73] Assignee: NEC Corporation, Tokyo, Japan

[21] Appl. No.: 775,154

[22] Filed: Oct. 9, 1991

[30] Foreign Application Priority Data

Oct. 9, 1990 [JP] Japan .................. 2-271047

[51] Int. Cl.$^5$ ............................ H04N 5/335
[52] U.S. Cl. ...................... 358/213.15; 358/213.11
[58] Field of Search .............. 358/213.15, 171, 172, 358/213.16, 213.17, 213.18, 167

[56] References Cited

U.S. PATENT DOCUMENTS

| | | | |
|---|---|---|---|
| 4,283,742 | 8/1981 | Izumita et al. | 358/213.15 |
| 4,651,213 | 3/1987 | Takimoto | 358/172 |
| 4,809,074 | 2/1989 | Imaide et al. | 358/213.15 |
| 4,816,917 | 3/1989 | Yamamoto et al. | 358/213.16 |
| 4,918,730 | 4/1990 | Schulze | 381/43 |
| 5,010,408 | 4/1991 | Toohey | 358/213.11 |

FOREIGN PATENT DOCUMENTS

59-23675  2/1984  Japan .
61-78284  4/1986  Japan .
2-192278  7/1990  Japan .

*Primary Examiner*—Herbert Goldstein
*Assistant Examiner*—Tuan V. Ho

[57] ABSTRACT

A sample hold circuit has a first sample hold circuit and a second sample hold circuit, which are of the same in circuit configuration, each having a clamping circuit at an input stage of the sample hold circuit and a sample-holding circuit at the next stage, and the first sample hold circuit and the second sample hold circuit receiving commonly at least a clamping reference voltage, a clamping control signal for the clamping circuit and a sampling control signal for the sample-holding circuit. An output of a CCD image sensor is inputted to only one of the first sample hold circuit and the second sample hold circuit, whereby the output signals from the first sample hold circuit and the second sample hold circuit are outputted in a differential mode. It is possible to reduce low frequency 1/f noise and reset pulse noise in the image signal produced by the CCD image sensor by inputting the output signals from the first and second sample hold circuits to a differential circuit.

4 Claims, 2 Drawing Sheets

X: RESET PULSE NOISE PERIOD
Y: FEED-THROUGH NOISE PERIOD
Z: PICTURE SIGNAL PERIOD

SAMPLER HOLD CIRCUIT FOR CCD IMAGE-SENSOR SIGNAL

BACKGROUND OF THE INVENTION

1. Field of the Invention

The present invention relates to a sample hold circuit and, more particularly, to a sample hold circuit which reduces the low frequency 1/f noise and also the reset pulse noise in the image signal which is obtained by a charge coupled device image sensor (hereinafter referred to as "CCD" image sensor).

2. Description of the Prior Art

FIG. 1 shows an example of a conventional circuit arrangement of a sample hold circuit for processing a CCD output signal. The circuit comprises a feed-through clamping circuit and a picture signal sample-holding circuit which are connected in series. A typical waveform of an image output signal obtained by the CCD image sensor and processed by such sample hold circuit is as shown in FIG. 2.

As shown in FIG. 2, each picture element of a CCD image output signal can be divided into three periods, namely, those of a reset noise, a feed-through signal and a picture signal. The reset noise is caused by a leakage of a reset pulse signal into the output, the reset pulse signal being for clearing a charge of the preceding picture element in the CCD. The signal required as a picture signal level is a differential voltage A between the feed-through period voltage and the picture signal period voltage in FIG. 2. The reset noise has thus no relation with the picture signal level, and when the picture signal level is small, the signal is buried in the reset noise, resulting in deterioration of the signal to noise (S/N) ratio. Further, usually a low frequency 1/f noise is overlapped or involved in the CCD image sensor output signal and, if this low frequency 1/f noise is not eliminated or removed effectively therefrom, the reproduced image becomes fluctuated or blurred and thus the image quality will be deteriorated.

Therefore, the sample hold circuit for processing the CCD image sensor output signal as shown in FIG. 1 has been proposed for the purpose of eliminating the reset noise and also the low frequency 1/f noise.

First, the CCD output signal inputted from an input terminal 31 is clamped at each picture element, under the feed-through clamping at operation for adjusting the feed-through period voltage of the input signal to a clamping reference voltage $V_{REF}$ supplied from a terminal 43, by a clamp capacitor 32 and a clamp switch 33, and thus the low frequency 1/f noise is rejected. The feed-through clamping operation is controlled by a clamping pulse $C_P$ externally applied through a terminal 41 to the circuit.

Next, the signal voltage of the largest amplitude level in the picture signal period in FIG. 2 is subjected to a sample-holding operation by a circuit formed by a buffer amplifier 34, a sample hold switch 35 and a hold capacitor 36, and is outputted from an output terminal 38 through a buffer amplifier 37. The sample-holding operation is controlled by a sampling pulse $S_P$ externally applied thorugh a terminal 42 to the circuit. After passing through the overall circuit as described above, the CCD image sensor output signal becomes a picture signal having a level of the feed-through voltage reference, with the low frequency 1/f noise as well as the reset noise and feed-through periods having been eliminated.

In the conventional sample hold circuit for the CCD image sensor as described above, where fluctuations occur in the clamping reference voltage $V_{REF}$ for effecting the feed-through clamping operation, the components of such fluctuations cannot be removed. In the case where these components of fluctuations cannot be removed by the optical black clamping operation which is conducted for each horizontal period by a signal processing circuit at the following stage, the picture quality will be deteriorated, because such components of fluctuations will still appear in the final output signal.

Moreover, since the high speed sampling is executed in the sample hold circuit, the sampling noise or switching noise occurs in transition of switching between the sampling operation and the non-sampling operation. This noise badly influences on the S/N ratio. This sampling noise can be reduced if the band width of the frequency characteristics of the signal route is narrowed towards the low frequency side. However, particularly in the case where a color image sensor is used, since a sample hold circuit for color separation is required in the next stage, the narrowing of the frequency band width, which distorts the wave shape, leads to problems such that the timing control on the sampling hold for color separation becomes much more limited and the control on sampling timing becomes much more difficult, or the color separation cannot be performed accurately depending on the circumstances involved.

SUMMARY OF THE INVENTION

It is, therefore, an object of the invention to overcome the problems existing in the conventional sample hold circuit and to provide an improved sample hold circuit.

It is another object of the invention to provide a sample hold circuit for CCD image-sensor signal, which is capable of outputting a high quality picture signal free from such noise as reset pulse noise and sampling noise.

According to the present invention, there is provided a sample hold circuit for processing an output signal from a CCD image sensor, the circuit having;

a first sample hold circuit and a second sample hold circuit, which have the same circuit configuration, each having a clamping circuit at an input stage of the sample hold circuit and a sample-holding circuit after the clamping circuit, and each of the first sample hold circuit and the second sample-hold circuit commonly receiving at least a clamping reference voltage and a clamping control signal for the clamping circuit and a sampling control signal for the sample-holding circuit, the output signal from the CCD image sensor being inputted to an input terminal of either one of the first and second sample hold circuits, and output signals being outputted from output terminals of the first and second sample hold circuits as a differential mode.

BRIEF DESCRIPTION OF THE DRAWINGS

The above and other objects, features and advantages of the present invention will be apparent from the following description of a preferred embodiment according to the invention explained with reference to the accompanying drawings, in which.

PREFERRED EMBODIMENT OF THE INVENTION

Now, an explanation is made on the invention by making reference to the appended drawings.

Figure 3:
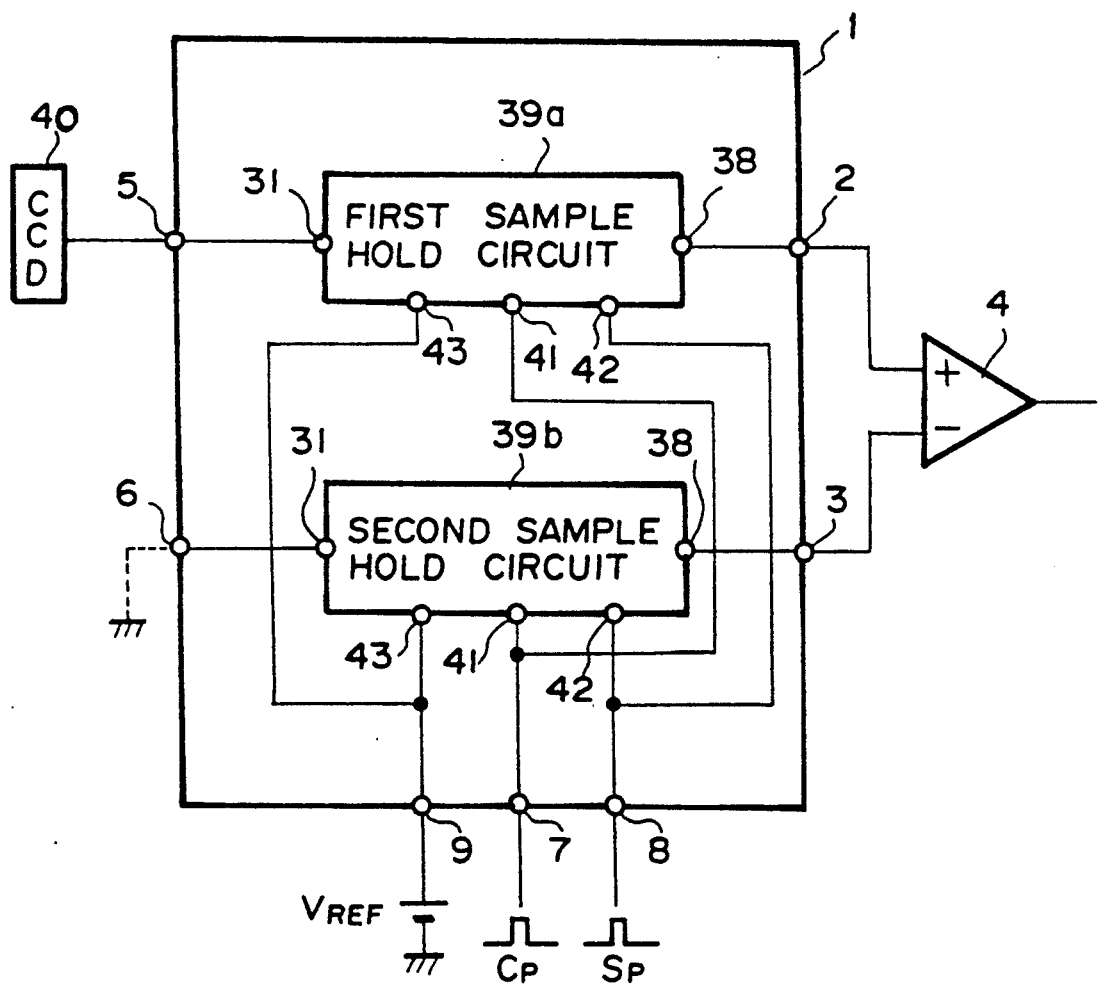
FIG. 3 is a circuit diagram showing the structure of the sample hold circuit according to the present invention.

The circuit arrangement according to the invention is shown in FIG. 3. In FIG. 3, the like part or elements having the same function as in the conventional example shown in FIG. 1 have been assigned the same numerals.

Figure 1:
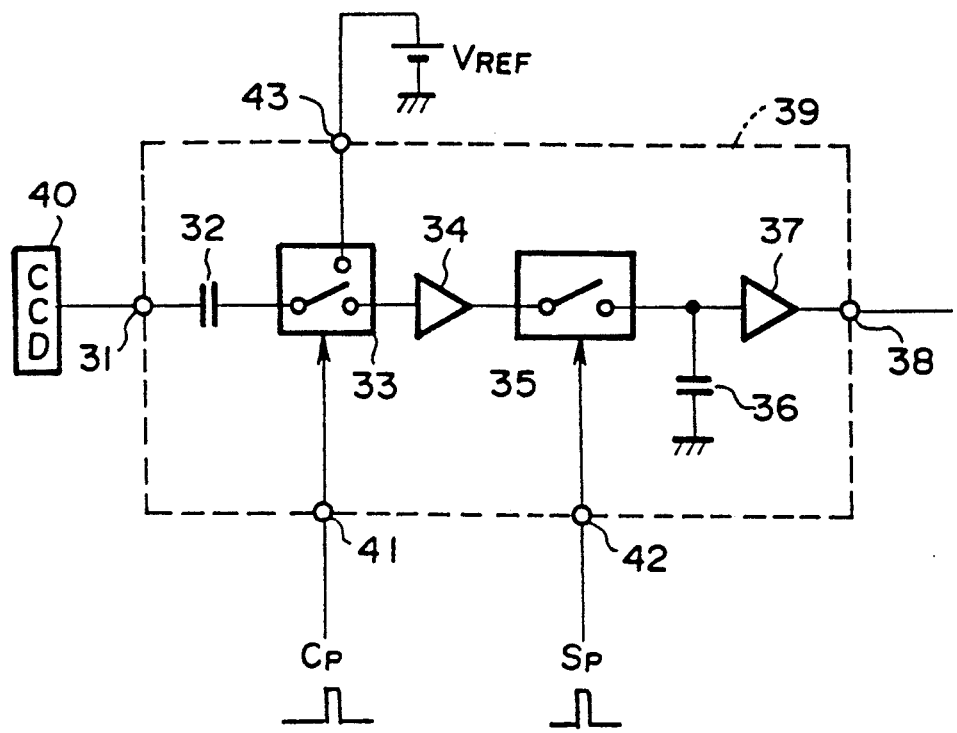
FIG. 1 is a circuit diagram showing the structure of a conventional sample hold circuit for processing the CCD image sensor output signal.
Figure 2:
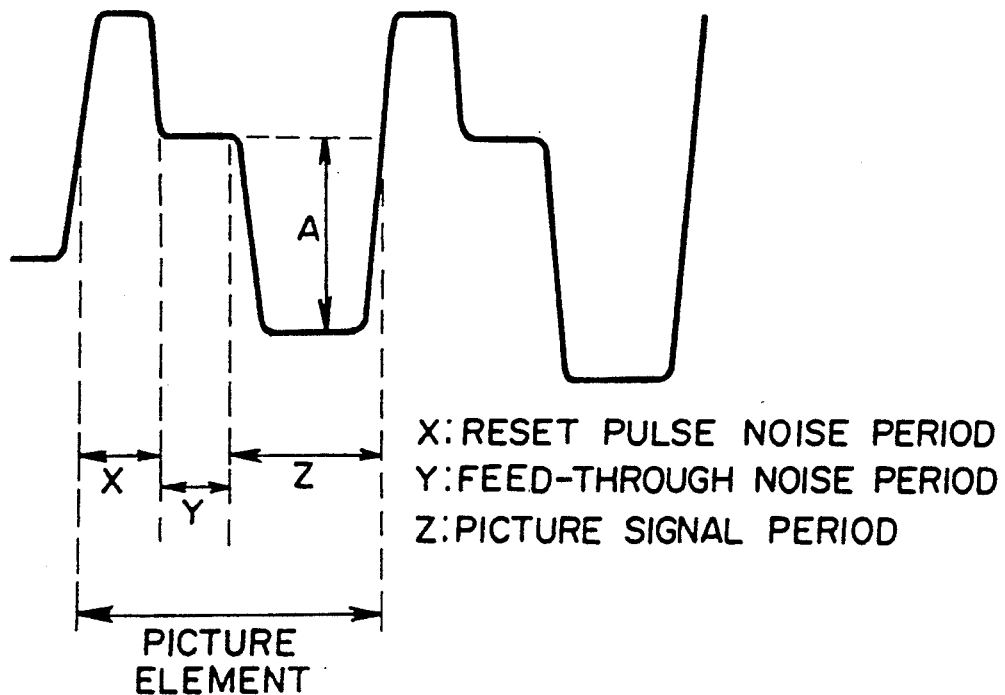
FIG. 2 is a graph showing a voltage waveform of the output signal from the CCD image sensor.

As shown in FIG. 3, the sample hold circuit 1 according to the invention is provided with two sample hold circuits 39a, 39b for the CCD image sensor output signal, each of which has the same circuit configuration as that shown in FIG. 1, and to each of which are commonly supplied the clamping reference voltage $V_{REF}$ for the clamp-through operation applied through a terminal 9 and also the same control signals such as the clamping pulse $C_P$ for the clamping operation applied through a terminal 7 and the sampling pulse $S_P$ for the sample-holding operation applied through a terminal 8. The output signal from the CCD image sensor 40 is inputted only to the input terminal 5 of the one sample hold circuit 39a but no signal is inputted to the input terminal 6 of the other sample hold circuit 39b. The output of the sample-hold circuit according to the invention is derived from a pair of output terminals 2, 3 as a differential output. Outputted from the one output terminal 2 is the picture signal which is obtained by having the output signal from the CCD image sensor 40 subjected to sample-holding operation by the sample-hold circuit 39a. On the other hand, outputted from the other output terminal 3 is the output of the sample hold circuit 39b to which no output from the CCD image sensor 40 is inputted. Since the two sample hold circuits 39a and 39b shown in FIG. 3 have the same circuit configuration and use the same control signal(s), the same noise caused by the fluctuations in the feed-through clamping reference voltage $V_{REF}$ and the same sampling noise are generated in each of the sample hold circuits 39a, 39b and are outputted from the output terminals 2, 3, respectively. Consequently, such noises become in-phase or common-mode components if they are received by a differential input type circuit 4 at the next stage. The differential input type circuit 4 may be a differential amplifier which uses a constant current source. For example, when the noises are received by such means as a differential amplifier having a high common mode rejection capability, which uses, e.g., a constant current source, it is possible to obtain an output signal with large reduction in the sampling noise and also the noise due to variations in the feed-through clamping reference voltage $V_{REF}$. As described above, by receiving the output signal from the one output terminal 2 and the output signal from the output terminal 3 in a differential mode by the following stage of the circuit, it is possible to produce an output signal with the sampling noise and the noise caused by the variations in feed-through clamping reference voltage having been effectively reduced. Moreover, the circuit according to the invention, as may be readily understood also from FIG. 3, has the advantage that it has strong stability against the variation in the power supply voltage.

In the case where the sample hold circuit 39 for the CCD image sensor output signal as shown in FIG. 1 is used for the sample hold circuits 39a, 39b shown in FIG. 3 according to the invention, it is desirable that the input terminal 6 of the sample hold circuit 39b to which the CCD image sensor output signal is not inputted, be connected to the ground potential, for the purpose of preventing the sudden input of external noise.

By using the sample hold circuit according to the invention, as explained above, the deterioration of the S/N ratio, caused by the sampling noise and the noise due to fluctuation in the reference voltage, can be decreased.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A sample hold circuit for processing an image signal, comprising:
   a first sample hold circuit and a second sample hold circuit, which have the same circuit configuration and each including a clamping circuit at an input stage of the sample hold circuit and a sample-holding circuit after said clamping circuit, and each of said first sample hold circuit and said second sample hold circuit commonly receiving at least a clamping reference voltage and a clamping control signal for said clamping circuit and a sampling control signal for said sample-holding circuit; and
   a differential input type circuit for receiving output signals from said first and second sample hold circuits;
   said first and second sample hold circuits being connected in the circuit for processing an image signal so that said image signal is inputted to an input terminal of either one of said first and second sample hold circuits, and said output signals being outputted from output terminals of said first and second sample hold circuits in a differential mode.

2. A sample hold circuit according to claim 1, in which an input terminal of one of said first and second sample hold circuits which is not inputted with said image signal is connected to a ground.

3. A sample hold circuit according to claim 1, in which said differential input type circuit is a differential amplifier having a high common mode rejection capability.

4. A sample hold circuit according to claim 1, in which each of said first and second sample hold circuits comprises:
   a clamping circuit including a clamp capacitor whose input is connected to said input terminal to receive said image signal, and a clamping switch to which the other end of said clamp capacitor is connected and which receives said clamping reference voltage and said clamping control signal; and
   a sample-holding circuit including a buffer circuit whose input is connected to said clamping switch, a sample-holding switch receiving an output from said buffer circuit, a hold capacitor connected between said sample-holding switch and a ground, and a buffer circuit whose input is connected to said sample-holding switch and whose output is connected to an output terminal.

* * * * *

UNITED STATES PATENT AND TRADEMARK OFFICE
CERTIFICATE OF CORRECTION

PATENT NO. : 5,216,509
DATED : June 1, 1993
INVENTOR(S) : Masahiro Hirasawa

It is certified that error appears in the above-identified patent and that said Letters Patent is hereby corrected as shown below:

TITLT PAGE: [54] "SAMPLER HOLD" should be

-- [54] SAMPLE HOLD --

Column 1, line 1, "SAMPLER HOLD should be

-- SAMPLE HOLD --

Signed and Sealed this

Eleventh Day of January, 1994

Attest:

BRUCE LEHMAN

*Attesting Officer*    *Commissioner of Patents and Trademarks*